United States Patent [19]

Haga et al.

[11] Patent Number: 4,911,495
[45] Date of Patent: Mar. 27, 1990

[54] SIDE SILL STRUCTURE FOR AUTOMOBILE

[75] Inventors: Hitoshi Haga; Hidenori Matsumoto, both of Utsunomiya, Japan

[73] Assignee: Honda Giken Kogyo Kabushiki Kaisha, Tokyo, Japan

[21] Appl. No.: 318,022

[22] Filed: Mar. 2, 1989

[30] Foreign Application Priority Data

Mar. 11, 1988 [JP] Japan .............. 63-31664[U]

[51] Int. Cl.⁴ ............................................. B62D 25/20
[52] U.S. Cl. .................................................. 296/209
[58] Field of Search ................ 296/209, 191, 185, 202

[56] References Cited

U.S. PATENT DOCUMENTS

| 4,471,992 | 9/1984 | Matsuura | 296/209 |
| 4,607,878 | 8/1986 | Itoh | 296/199 |
| 4,682,812 | 7/1987 | Hurten et al. | 296/209 |
| 4,717,197 | 1/1988 | Harasaki | 296/202 |

FOREIGN PATENT DOCUMENTS 56-35473 4/1981 Japan .

Primary Examiner—Robert R. Song
Attorney, Agent, or Firm—Armstrong, Nikaido, Marmelstein, Kubovcik & Murray

[57] ABSTRACT

An outer sill panel formed integrally with a side panel of the car body is joined to an inner sill panel to form an enclosed structure in cross-section. The panel joints are at the top and outer side of the side sill. The inner sill panel is thicker than the outer sill panel. A cover may be provided extending to cover an outer side surface and a bottom surface of the side sill as well as a joint between the side sill and the floor panel of the car body. A partition plate can be provided for reinforcing in the vicinity of a base portion of a center pillar of the side panel.

4 Claims, 3 Drawing Sheets

SIDE SILL STRUCTURE FOR AUTOMOBILE

BACKGROUND OF THE INVENTION

This invention relates to a side sill structure provided at the lower portion of automotive side panels.

Conventionally, the side sill comprising a outer sill panel and a inner sill panel joined together to form an enclosed structure in cross section is welded to the lower portion of the side panel. The joints of the outer sill panel and the inner sill panel are generally provided on the top side and underside of the side sill. There is also a side sill which has the panel joints at the top and at the outer side, as disclosed in the Japanese Unexamined Utility Model Application Publication No. 35473/1981.

In the prior art disclosed by the above-cited publication, there is no panel joint at the underside of the side sill. This provides an advantage of preventing the formation of rust that can result from the muds splashed on the joint.

For materializing cost reduction by reducing the number of parts, it is desired that the outer sill panel be formed to be integral with the side panel. In that case, the outer sill panel and the side panel come in equal thickness. Since the side panel has to be made relatively thin in order to reduce the weight of the car body, the outer sill panel is made likewise thin, giving rise to the problem of how to compensate for the lowered rigidity of the outer sill panel resulting from the insufficient thickness thereof.

It is an object of this invention to provide a side sill structure which has the outer sill panel formed integrally with the side panel and which has a sufficient rigidity. This is achieved by taking advantage of the fact that, with a side sill having panel joints provided at the top and the outer side, the ratio of the cross-sectional area of the outer sill panel to the cross-sectional area of the complete side sill is smaller than in other structures.

SUMMARY OF THE INVENTION

To achieve the above object, this invention provides a side sill which consists of an outer sill panel nd an inner sill panel joined together to form an enclosed structure in cross section having the panel joints provided at the top and the outer side of the side sill, wherein the outer sill panel is formed integrally with the side panel of the car body and the inner sill panel is formed thicker than the outer sill panel.

The inner sill panel is formed to have a cross sectional shape extending from a joint at the top of the side sill, via an inner side and an underside of the side sill, to a joint at the outer side of the side sill. The ratio of the cross-sectional area of the inner sill panel to the cross-sectional area of the complete side sill is far larger than the ratio of the cross-sectional area of the outer sill panel to the cross-sectional area of the complete side sill. Thus, although the outer sill panel is made thin because it is formed integrally with the side panel, the inner sill panel can still be made thick enough to retain a higher degree of rigidity.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
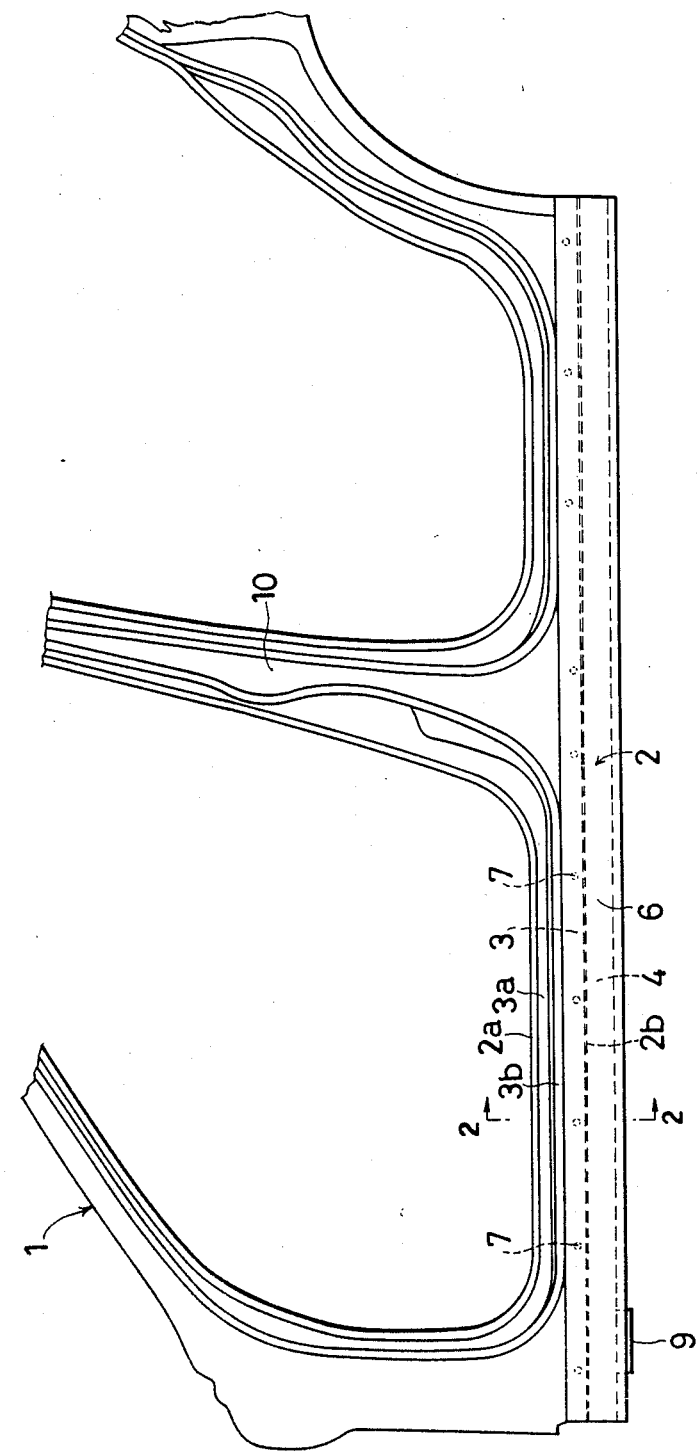
FIG. 1 is a side view of one example of a side panel with a side sill according to this invention.
Figure 2:
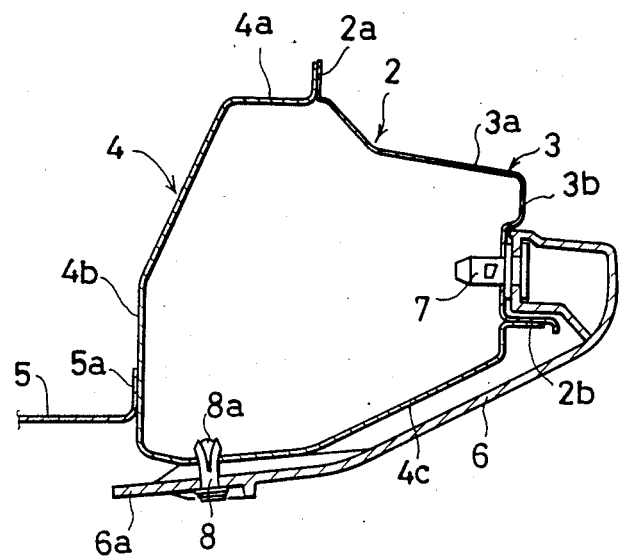
FIG. 2 is an enlarged cross section taken along the line II—II of FIG. 1.

Referring to FIG. 1, a side panel 1 includes a side sill 2 extending longitudinally at the lower part of the side panel. As shown in FIG. 2, the side sill 2 comprises an outer sill panel 3 and an inner sill panel 4, both spot-welded together at an upper joint 2a located at the top of the side sill 2 and at an outer side joint 2b located at the outer side of the side sill 2, to form an enclosed structure in cross section.

The outer sill panel 3 consists of an upper plate portion 3a extending outwardly from a flange member constituting one part of the upper joint 2a, and a stepped side plate portion 3b extending downwardly from the outer edge of the upper plate portion 3a. The stepped side plate portion 3b has the lower end thereof bent and formed as a flange member constituting one part of the outer side joint 2b. The outer sill panel 3 is formed integral with the side panel 1 and its thickness is made substantially equal to that of the side panel 1, that is about 0.75 mm.

The inner sill panel 4 consists of an upper plate portion 4a extending inwardly from a flange member constituting the other part of the upper joint 2a, a bent side plate portion 4b extending downwardly from the inner edge of the upper plate portion 4a, and a bent lower plate portion 4c extending outwardly from the lower end of the side plate portion 4b. The bent lower plate portion 4c has the outer side end thereof formed, via a riser portion, as a flange member constituting the other part of the outer side joint 2b. The thickness of the inner sill panel 4 is set at about 1.4 mm, nearly two times that of the outer sill panel 3, so as to increase the rigidity of the side sill 2.

A floor panel 5 is joined to the inner side surface of the side sill 2. A cover 6 is provided extending to cover the outer and lower sides of the side sill 2. The cover 6 prevents possible damage or formation of rust due to splashed mud. The lower part 6a of the cover 6 covering the lower side of the side sill 2 is extended to cover from under a joint 5a between the floor panel 5 and the inner side of the side sill so as to prevent rusting of the joint 5a due to splashed mud.

Figure 3:
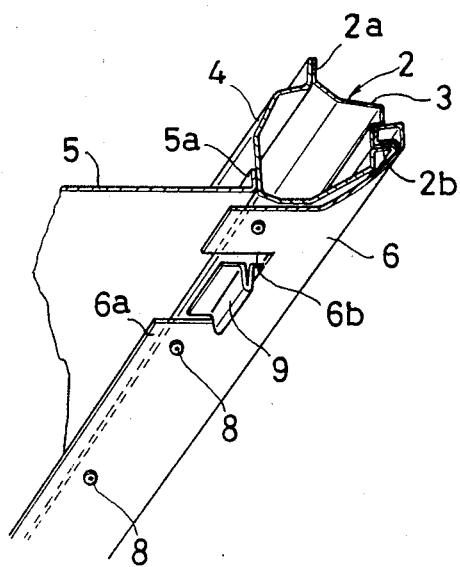
FIG. 3 is a perspective view of the side sill as seen from below.

The cover 6 is formed by injection molding and has a longitudinally extending, hollow portion at its upper end. Attached to the inward-facing wall of the hollow portion are clips 7, which are engaged with the side plate portion 3b of the outer sill panel 3. The cover 6 also has clips 8 at the lower edge portion which are each expanded by a pin 8a. The clips 8 are engaged with the lower plate portion 4c of the inner sill panel 4. As shown in FIG. 3, a seat member 9 for jacking up the automobile is provided on the lower plate portion 4c of the inner sill panel 4. The cover 6 has a recess 6b in the lower edge portion thereof near the front end of the side sill 2 in such a manner that it may correspond in position to the seat member 9.

If the outer sill panel 3 is formed to be integral with the side panel 1, a center pillar 10 makes an integral part rising from the outer sill panel 3 so that the side sill 2 has an upwardly opening cross section at the intersection with the center pillar 10.

Figure 4:
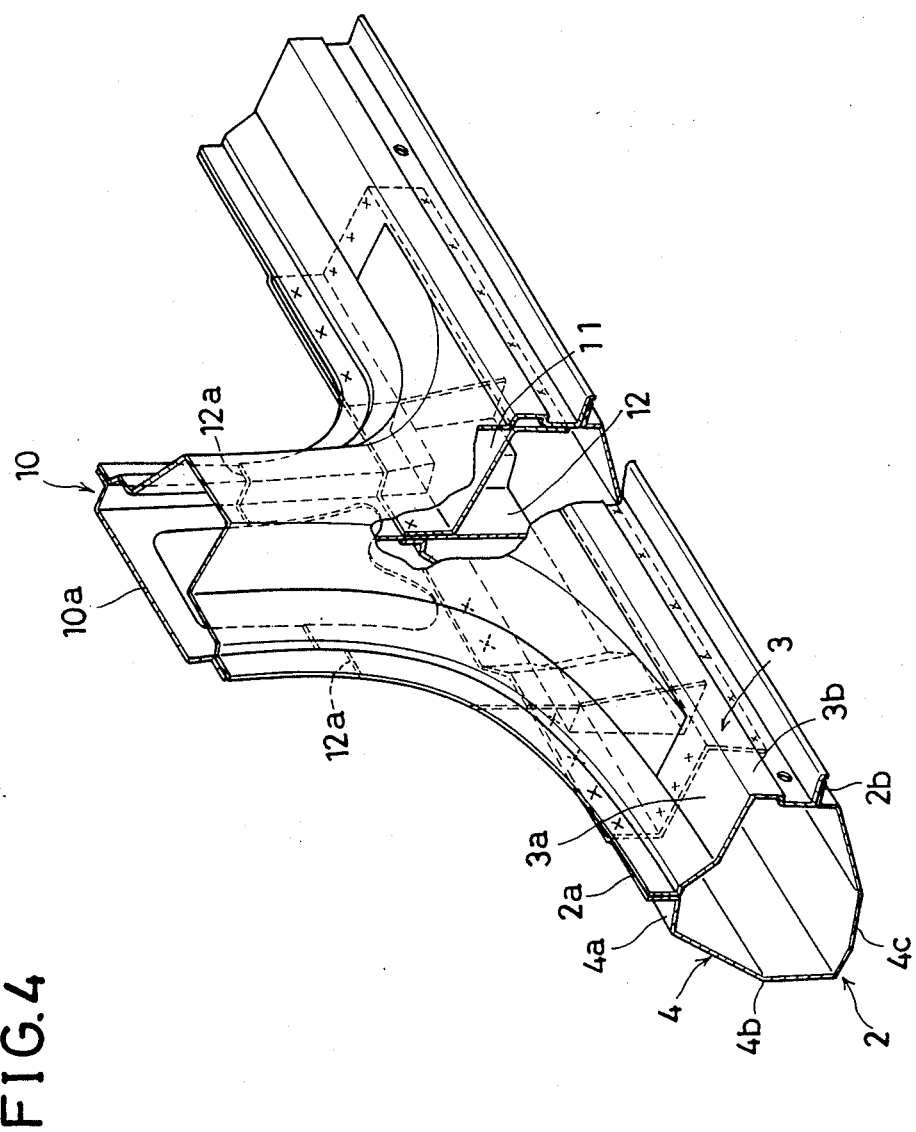
FIG. 4 is a partially cut away, perspective view of the intersection of the side sill and the center pillar.

In this embodiment, therefore, as shown in Fig. 4, a partition plate 11 extending between the front and rear ends of the base portion of the center pillar 10 is welded to the inner surface of the outer sill panel 3 so that the side sill 2 is of enclosed structure in cross section even at the intersection with the center pillar 10 as is at other parts thereof, thus increasing the rigidity of the side sill. Further, a stiffener 12, which has a joint 12a joining the lower end of the inner portion 10a of the center pillar 10 is welded to the inner surface of the inner sill panel 4. In addition, at portions of the upper joint 2a, said portions being located at the front and rear ends of the base portion of the center pillar 10, the outer sill panel 3 and the inner sill panel 4 are welded together with one bent portion of the partition plate 11 sandwiched therebetween and the middle part of said one bent portion is welded to the inner sill panel via the stiffener 12 sandwiched between the said one portion and the inner sill panel.

As explained above, according to this invention, it is possible to reduce the number of parts and therefore cost by making the outer sill panel and the side panel as an integrally formed structure. Also, since the joints at which the outer sill panel and the inner sill panel are joined are provided at the top and the outer side of the side sill, the ratio of the cross-sectional area of the outer sill panel to the cross-sectional area of the complete side sill is reduced. Accordingly, the inner sill panel has the cross-sectional area accounting for a larger proportion of the total cross-sectional area of the side sill, and is formed to be thick, thus securing a sufficient rigidity for the side sill.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A side sill structure for an automobile including a car body having a side panel and a floor panel, said side sill structure comprising an outer sill panel and an inner sill panel joined together to form an enclosed structure in cross section, the panel joints being provided at a top and an outer side of tee side sill, said outer sill panel being an integral layer portion of the side panel of the car body, and said inner sill panel being thicker than said outer sill panel.

2. A side sill structure for an automobile, as set forth in claim 1, further comprising a cover extending to cover an outer side surface and a bottom surface of the side sill, said cover having a lower edge portion covering the bottom surface of the side sill and extending inwardly to cover, from below, a joint between the floor panel of the car body and an inner side of the side sill.

3. A side sill structure for an automobile as set forth in claim 1, further comprising a partition plate extending between the front and rear ends of a base portion of a center pillar formed on the side panel, said partition plate being welded to the inner surface of the outer sill panel.

4. A side sill structure for an automobile as set forth in claim 2, further comprising a partition plate extending between the front and rear ends of a base portion of a center pillar formed on the side panel, said partition plate being welded to the inner surface of the outer sill panel.

* * * * *